(12) United States Patent
Lusardi et al.

(10) Patent No.: US 7,769,501 B2
(45) Date of Patent: Aug. 3, 2010

(54) USER-CONFIGURABLE ELECTRONIC FLIGHT BAG

(75) Inventors: Robert Allen Lusardi, Newberg, OR (US); Scott Myles Crockard, Oregon City, OR (US)

(73) Assignee: The Boeing Company, Chicago, IL (US)

(*) Notice: Subject to any disclaimer, the term of this patent is extended or adjusted under 35 U.S.C. 154(b) by 1225 days.

(21) Appl. No.: 10/874,889

(22) Filed: Jun. 23, 2004

(65) Prior Publication Data

US 2005/0288831 A1    Dec. 29, 2005

(51) Int. Cl.
*G06F 7/00* (2006.01)
*G01C 23/00* (2006.01)

(52) U.S. Cl. ............. 701/3; 701/10; 701/4; 701/202; 701/35; 701/14; 701/29; 701/30; 340/945; 340/971; 340/973; 345/204; 345/205

(58) Field of Classification Search .......... 701/3, 701/10, 202, 14, 4, 29, 30; 340/973, 945, 340/971; 345/204, 205
See application file for complete search history.

(56) References Cited

U.S. PATENT DOCUMENTS

| | | | | |
|---|---|---|---|---|
| 4,642,775 | A | * | 2/1987 | Cline et al. ............... 701/200 |
| 4,827,419 | A | * | 5/1989 | Selby, III ................. 701/200 |
| 5,172,321 | A | * | 12/1992 | Ghaem et al. ........... 455/456.5 |
| 5,270,931 | A | * | 12/1993 | Appleford ................... 701/3 |
| 5,414,809 | A | * | 5/1995 | Hogan et al. ............... 715/765 |
| 5,581,462 | A | * | 12/1996 | Rogers ........................ 701/3 |
| 6,131,066 | A | | 10/2000 | Ahrens et al. |
| 6,134,500 | A | * | 10/2000 | Tang et al. ................. 701/202 |
| 6,259,977 | B1 | * | 7/2001 | Mayer et al. ............... 701/14 |
| 6,349,257 | B1 | * | 2/2002 | Liu et al. .................. 701/200 |
| 6,597,294 | B1 | * | 7/2003 | Ariens ................. 340/995.26 |
| 6,606,544 | B2 | * | 8/2003 | Glenn et al. ................. 701/3 |
| 6,633,801 | B1 | * | 10/2003 | Durlacher et al. ............ 701/9 |
| 6,801,769 | B1 | * | 10/2004 | Royalty ................... 455/431 |
| 6,832,152 | B1 | * | 12/2004 | Bull et al. ................ 701/200 |

(Continued)

OTHER PUBLICATIONS

Allen, "Electronic Flight Bag" Aero Magazine pp. 16-27, Jul. 2003.*

(Continued)

*Primary Examiner*—Thomas G Black
*Assistant Examiner*—Wae Lenny Louie
(74) *Attorney, Agent, or Firm*—Armstrong Teasdale LLP

(57) ABSTRACT

An electronic flight bag for use aboard an aircraft during flight is disclosed. The electronic flight bag includes an electronic storage device which acts as a container for storing various user-configurable flight-related objects, such as flight routes as defined by way-points, airport information that includes approach routes, associated fight charts or other desired charts, temporary flight restrictions, and weather information as well as any other user-defined data objects associated with the flight. For example, the electronic flight bag may be used in corporate aircraft and may include one or more data objects that relate to the corporate policies with respect to flights. The data objects may also include time-sensitive data and contain time flags that can be updated by way of a communication link during flight. In accordance with an important aspect of the invention, the data objects are user-configurable so that a user can include virtually all information that is relevant to a particular flight.

15 Claims, 5 Drawing Sheets

RoutePack Plan Phase

U.S. PATENT DOCUMENTS

| | | | |
|---|---|---|---|
| 7,072,746 B1 * | 7/2006 | Burch | 701/14 |
| 7,149,612 B2 * | 12/2006 | Stefani et al. | 701/35 |
| 7,222,017 B2 * | 5/2007 | Clark et al. | 701/120 |
| 7,363,145 B2 * | 4/2008 | Conner et al. | 701/120 |
| 7,467,121 B2 * | 12/2008 | Hagelin | 706/47 |
| 2002/0098800 A1 | 7/2002 | Frazita et al. | |
| 2002/0165647 A1 | 11/2002 | Glenn et al. | |
| 2003/0003872 A1 * | 1/2003 | Brinkley et al. | 455/66 |
| 2004/0006412 A1 | 1/2004 | Doose et al. | |
| 2004/0180653 A1 * | 9/2004 | Royalty | 455/431 |
| 2005/0283305 A1 * | 12/2005 | Clark et al. | 701/120 |
| 2005/0288831 A1 * | 12/2005 | Lusardi et al. | 701/3 |

OTHER PUBLICATIONS

Mecham, "New 777 Introduces Electronic Flight Bag", Aviation Week & Space Technology, Dec. 2, 2002, vol. 157, Issue 23, p. 64 2/3p.*

"Jeppesen's Electronic Flight Bag", Jeppesen.com, online, Oct. 9, 2003, pp. 1-4, XP 002347096; Retrieved from the Internet: URL:http//web.archieve.org/web/20031009082943.

www..jeppesen.com/wlcs/index.jsp?section=about &content=product_efb.jsp/retrieved.

"Electronic Flight Bag" Brochure, Online; May 1, 2003, pp. 1-12, XP 002347097; Retrieved from the Internet:URL:http://webarchieve.org/web/20050928063621/http://www.jeppesen.com/download/misc/EFB.pdf/.

European Search Report of European Patent Application No. 05 013 601.9; Jan. 16, 2009; 4 pages.

Jeppesen's Electronic Flight Bag; www.jeppesen.com; Oct. 19, 2003; 4 pages.

Electronic Flight Bag; Jeppesen Brochure; www.jeppesen.com; May 1, 2003; 12 pages.

* cited by examiner

USER-CONFIGURABLE ELECTRONIC FLIGHT BAG

BACKGROUND OF THE INVENTION

1. Field of the Invention

The present invention relates to an electronic flight bag for use on board an aircraft and, more particularly, to an electronic flight bag which includes an electronic storage device configured as a container for storing various user-configurable flight-related objects for all required and desired information for a particular flight, such as flight routes, as defined by way-points, airport information, temporary flight restrictions, and weather information as well as any other user-defined objects associated with a flight or otherwise.

2. Description of the Prior Art

Various navigational systems are known in the art. For example, U.S. Pat. No. 4,642,775 relates to an electronic flight-planning and information system, which includes a portable computer that in a ground mode of operation is adapted to be connected to a ground-based computer system by way of a communication link, such as a telephone line. In the ground mode, the ground-based computer system generates a number of optimized flight plans along with weather information associated with those flight plans. The optimized flight plans and weather information are subsequently loaded onto an electronic storage device, such as a floppy disk. In a flight mode, the information on the floppy disk is loaded onto the aircraft on-board flight management computer. Although the system disclosed in the '775 patent functions as a navigational aid, the type of information available to a user with such a navigational aid is fixed. In other words, the only type of information that can be loaded onto the on-board flight management computer are the way-points along the planned route, as well as various flight plan data for each leg of the flight plan, including predicted fuel flows, estimated time and route, predicted fuel consumption, distance to be traveled, and forecasted weather. Unfortunately, the system disclosed in the '775 patent does not allow any additional type of information or data objects to be included. For example, temporary flight restrictions, as well as various flight information, such as, runway approach information, are not included as available types of information to the user of the system disclosed in the '775 patent. Accordingly, the pilot using such a navigation system would still need to carry a physical flight bag so that such information would be available aboard the aircraft during a flight.

U.S. Pat. Nos. 4,827,419; 5,581,462 and 6,134,500 also relate to electronic navigational systems for use aboard an aircraft during flight. More particularly, U.S. Pat. No. 4,827,419 relates to an electronic storage system that enables navigational charts to be printed on demand. Essentially, the electronic storage system, as disclosed in the '419 patent, is a compilation of various predetermined data objects which can be selected and printed on demand.

U.S. Pat. No. 5,581,462 relates to a data cartridge that allows various fixed data objects to be stored in the data cartridge during a ground mode and loaded into the aircraft's main navigational computer for use during flight. The fixed data objects include aircraft mission or task data. In flight, the data cartridge is plugged into the main avionics system. Unfortunately, the pilot that uses such a system will still require a physical flight bag, since various types of information, such as runway approach and other types of information, are not available with the cartridge.

U.S. Pat. No. 6,134,500 discloses an electronic navigational aid for generating a flight plan. This patent, as well as various commercially available software packages, such as various navigational systems available from Jeppesen, such as FliteStar software (www.jeppesen.com), as well as others, facilitate flight plans being generated electronically.

Unfortunately, none of the systems disclosed above can be used to totally eliminate the need for a physical flight bag since none of the systems mentioned above include all of the information required during a flight. Thus, there is a need for a navigational system which emulates an electronic flight bag in which the data objects therein are user-configurable to allow users to include all the information that they may individually require or desire for a flight to obviate the need for a physical flight bag in a paperless cockpit environment.

SUMMARY OF THE INVENTION

Briefly, the present invention relates to an electronic flight bag for use on board an aircraft during flight. The electronic flight bag and includes an electronic storage device configured as a container for storing various user-configurable objects, such as flight-related objects, such as flight routes as defined by way-points, airport information that includes approach routes, associated fight charts or other desired charts, temporary flight restrictions, and weather information, as well as any other user-defined data objects associated with the flight. For example, the electronic flight bag in accordance with the present invention may be used in corporate aircraft and may include one or more data objects that relate to the corporate policies with respect to corporate flights. In accordance with an important aspect of the invention, the data objects are user-configurable so that a user can include virtually all desired and required information for a particular flight in a single electronic container.

DESCRIPTION OF THE DRAWING

These and other advantages of the present invention will be readily understood with reference to the following specification and attached drawing wherein.

DETAILED DESCRIPTION

The present invention relates to an electronic flight bag for use on board an aircraft during flight. The electronic flight bag may be configured as a standalone portable device which contains all of the information normally included in a physical flight bag that may be required and desired for a particular flight contained in furtherance of a paperless cockpit environment. In particular, the flight bag includes an electronic storage device configured as a container for storing various user-configurable flight-related objects. Unlike known navigational aids in which the data objects are fixed, the electronic flight bag in accordance with the present invention is formed from user-configured data objects so as to obviate the necessity of a physical flight bag. During a ground phase, the electronic flight bag is populated with all data required and desired during a particular flight onto a standalone computing platform and carried on board the aircraft for use during a flight phase and thus avoids the necessity for a physical flight bag. In accordance with another important aspect of the invention, the flight data can be updated during flight and saved for use in subsequent flights. As such, the flight data between particular points of a flight can be optimized for use on later flights.

Figure 1:
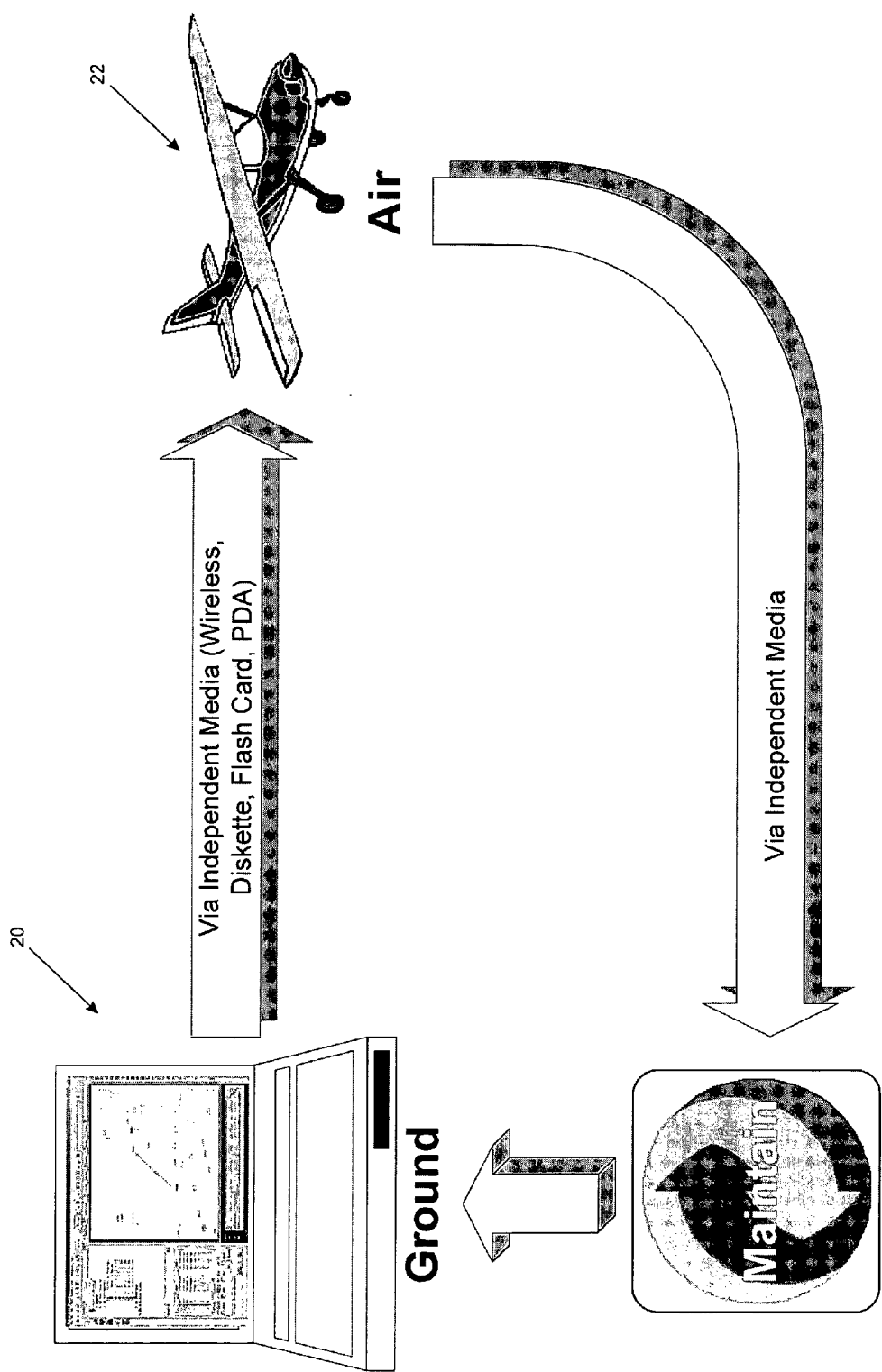
FIG. 1 is a block diagram, illustrating the life cycle of the electronic navigational system in accordance with the present invention.

Turning to the drawings, FIG. 1 illustrates the life cycle of the electronic flight bag in accordance with the present invention. Like conventional systems, flight information required during a flight is assembled on the ground and carried aboard the aircraft for use during the flight. The electronic flight bag in accordance with the present invention emulates a physical flight bag in that contains all of the information required and desired by a pilot during a particular flight. Moreover, since the data required for a flight normally varies for a particular user (i.e., commercial, private, or military) and for a particular flight, the electronic flight bag can be used in all of such applications. As will be discussed below, the user may select from various data objects and store those objects on an electronic storage medium or electronic container by way of a computing platform, such as a personal computer 20 Just as a pilot decides what information to include in a physical flight bag, a user of the electronic flight bag in accordance with the present invention can load various flight-related objects, as discussed below, into the electronic container for use aboard the aircraft 22 during flight. This information can be obtained from various sources, including aircraft navigational data content providers, such as Jeppesen (www.jeppesen.com); aircraft manufacturer content providers, as well as third-party content providers. These various data objects can be obtained over the Internet, for example, or otherwise and stored in the electronic container. For example, navigational chart information from, for example, www.jeppesen.com, may be accessed and loaded onto the electronic container as discussed below. All such information may be loaded into the electronic container and configured in a data tree structure.

The electronic container may be, for example, a standalone electronic medium, such as an electronic storage device, such as a diskette, flash card, flash drive or be hosted by a standalone computing environment, such as a personal computer 20 or a personal digital assistant (PDA), not shown. The electronic container may be portable and thus can be carried aboard an aircraft 22 and accessed during a flight phase and hosted by a computing platform. In order to avoid re-certification of the aircraft's existing on-board navigational system, the electronic container is hosted by a computing platform independent from the aircraft's on-board navigational system. The data in the electronic computer may be updated during flight and stored for use in future flights.

Figure 2:
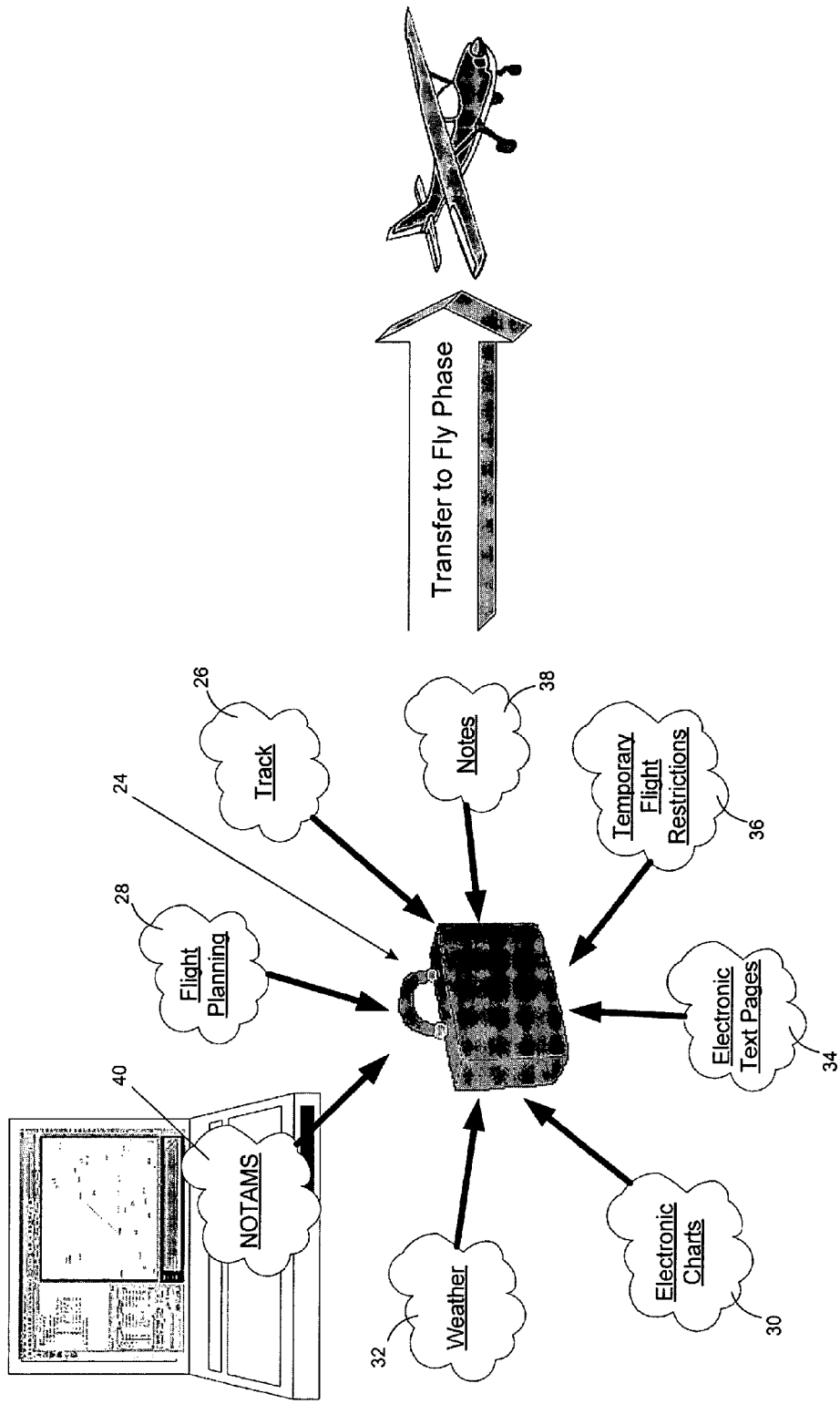
FIG. 2 is a block diagram, illustrating the planning phase of the electronic flight bag in accordance with the present invention.

Turning to FIG. 2, the electronic flight bag is illustrated graphically and identified with the reference numeral 24. The electronic flight bag 24 may contain various flight-related objects selectable by the user. Exemplary flight related objects may include flight routes, as defined by way-points, identified as track information 26; flight planning data 28; identified as airport information that includes approach routes; navigational charts 30; weather data 32; electronic text data 34; temporary flight-restriction data 36, notes 28, and Notams 40 (Notices to Airmen). As used herein, each category of information—track 26, flight planning data 28, electronic charts 30, weather data 32, electronic text data 34, temporary flight-restriction data 36, notes 28, as well as Notams 40—is considered to be a data object.

The track 26 relates to route data, for example, data defined by various way-points. Flight planning data 28 may include various flight planning data, such as airport approaches. Electronic charts 30 may include various navigational charts, for example, such as available from www.jeppesen.com. Weather data 32 may consists of forecasted weather information, for example, from the National Weather Service, for the flight. The electronic text page object 34 may be used for various purposes. For example, for corporate users, electronic text pages may comprise the corporate policy with respect to corporate flights.

The temporary flight-restrictions object 36 may include various temporary flight restrictions related to the flight. These temporary flight restrictions can be used to restrict air travel through particular airspace for various purposes, such as takeoff and landing of a NASA Space Shuttle, flight of Air Force One, and other restrictions as dictated by the Federal Aviation Administration in the interest of national security. The notes object 38 can be used for any supplemental notes by the user or pilot. Finally, the Notams object 40 can be used for any Notams issued which relate to the flight route.

All of the above-mentioned data objects may be imported from various data sources and incorporated into the electronic flight bag 24 for use aboard the aircraft. Virtually any additional data objects can be added to the electronic flight bag. These data objects may be obtained from virtually any source ad electronically stored in the electronic flight bag for later use aboard an aircraft.

Figure 3:
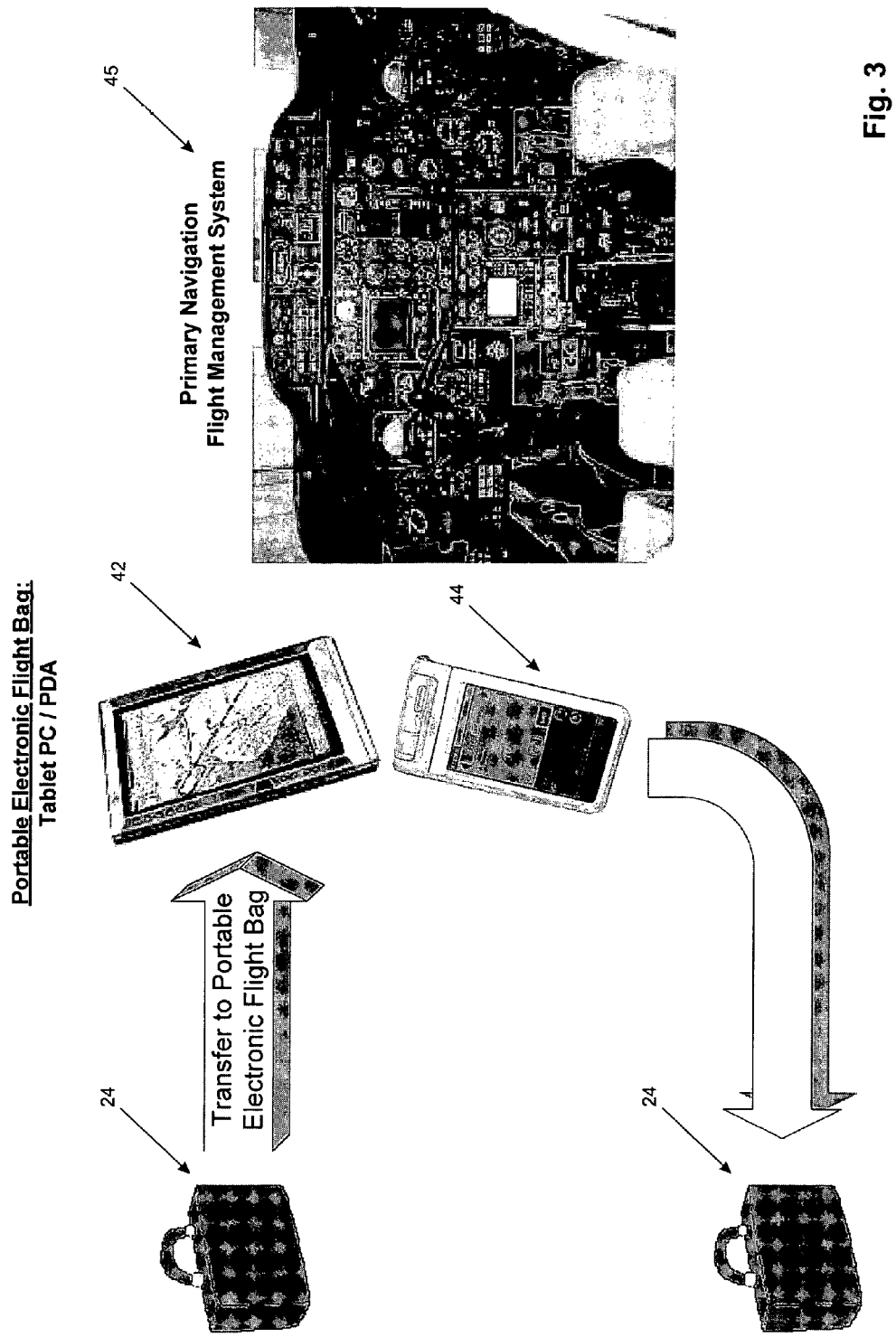
FIG. 3 is a simplified block diagram, illustrating the flight phase of the electronic flight bag in accordance with the present invention.
Figure 4:
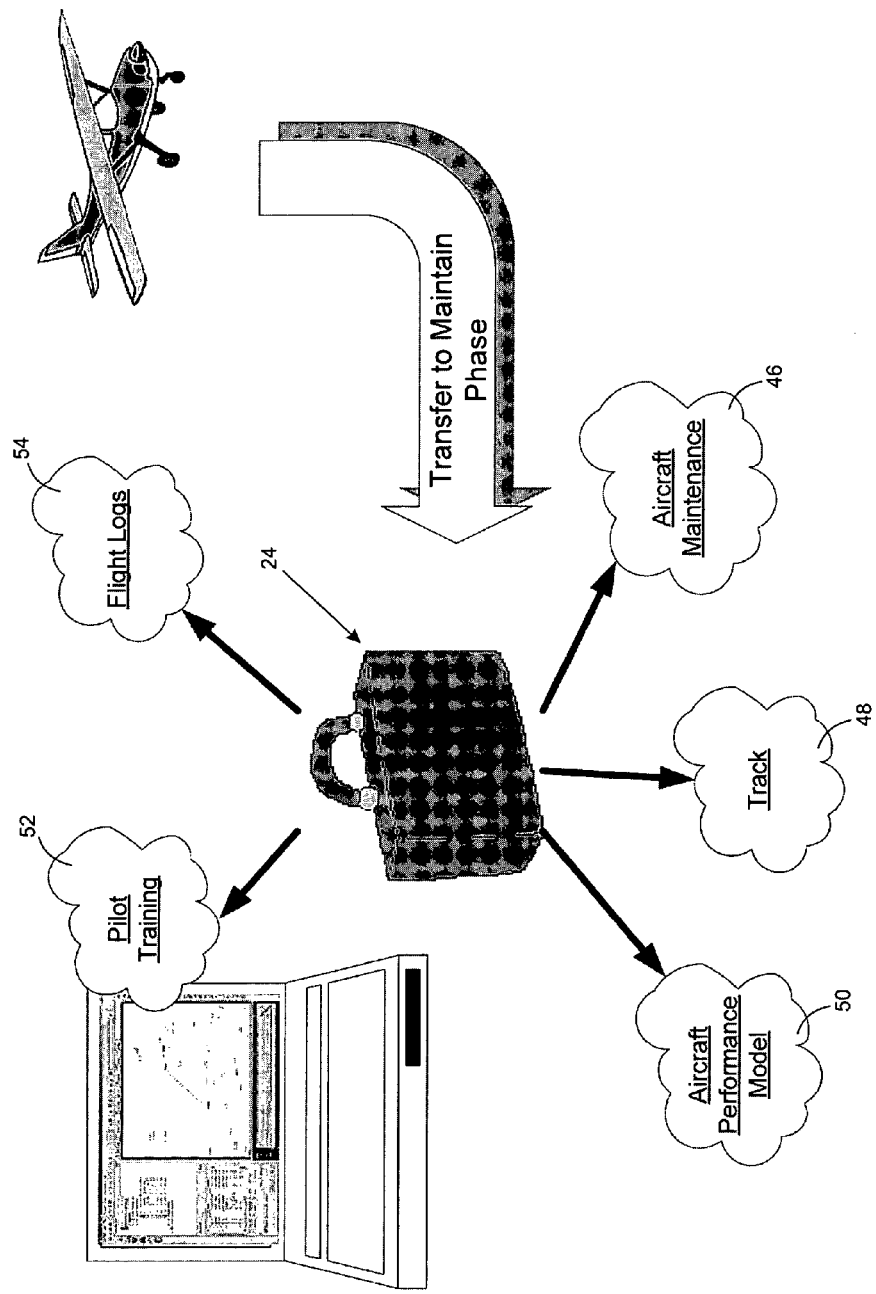
FIG. 4 is a simplified diagram, illustrating the maintenance phase of the electronic flight bag in accordance with the present invention.

As illustrated in FIG. 3, all of the data objects in the electronic flight bag 24 may be hosted by an independent computing platform, such as a tablet PC 42, PDA 44 or alternatively stored in an electronic storage device, such as a floppy disk or another type of portable memory device, such as a USB flash drive and carried on board an aircraft 22 and hosted by a computing platform aboard the aircraft during a flight phase. The electronic flight bag is used on board the air craft 24 in the same way a user or pilot uses data from a physical flight bag during flight. Any changes in the data objects can be made in flight by way of an independent computing platform, such as a tablet PC 42 or PDA 44 and stored. These changes may include route changes, such as the addition of way points or other changes. The updated objects are maintained in the electronic flight bag 24 for subsequent use. More particularly, the electronic flight bag 24 is maintained, as indicated in FIG. 4, and used for various ground related purposes, such as aircraft maintenance 46, modifications to the route or track 48, aircraft performance model 50, pilot training 52, and flight logs 54.

Electronic Flight Bag Data Structure.

Figure 5:
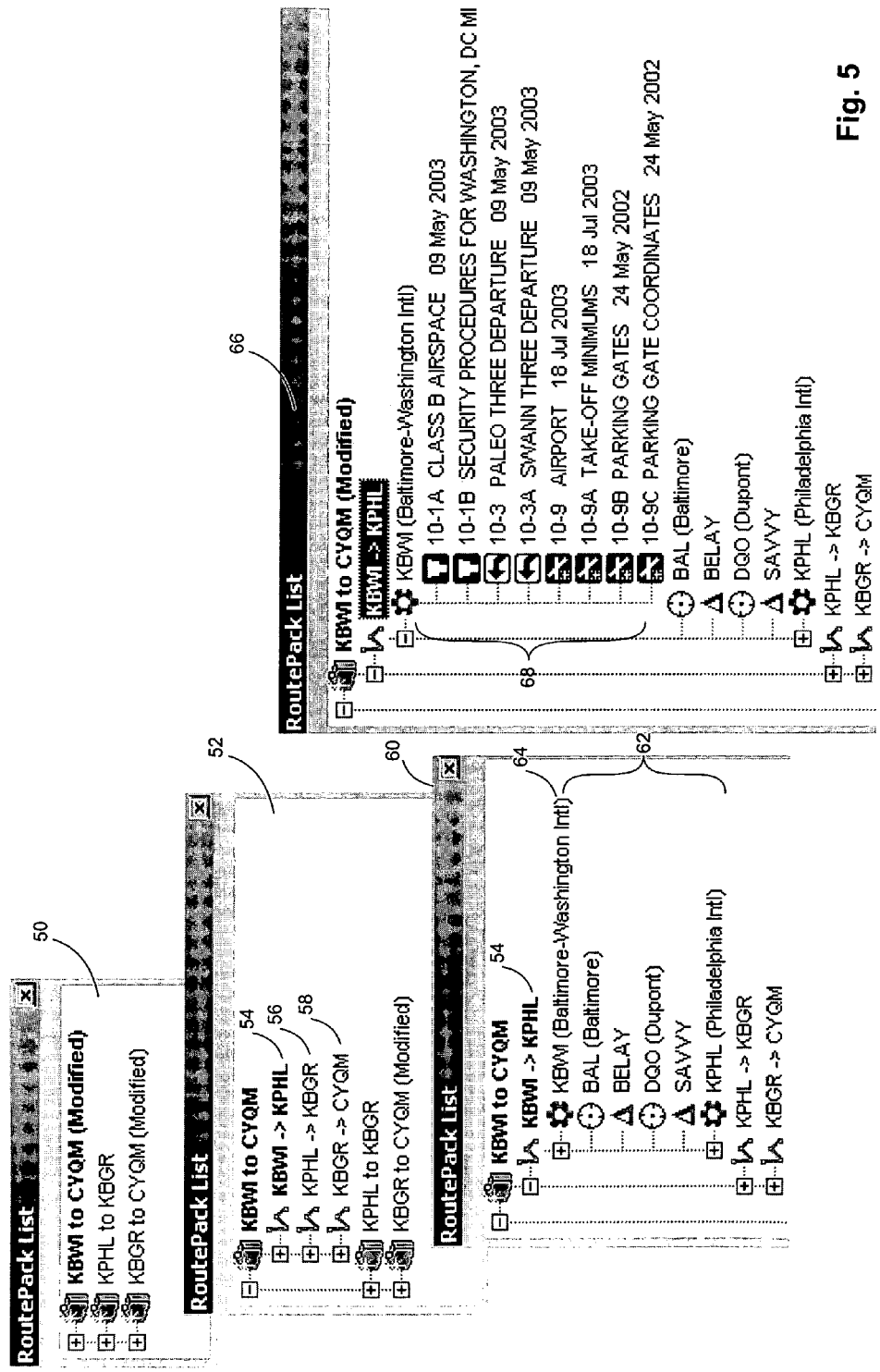
FIG. 5 illustrates an exemplary embodiment of the data structure of the electronic flight bag in accordance with the present invention.

All data objects may be displayed in a tree structure, as illustrated in FIG. 5. The tree structure illustrated in FIG. 5 illustrates an exemplary flight, Baltimore-Washington International Airport to Greater Moncton International Airport in New Brunswick, Canada (CYQM). This flight is broken up into three legs. The first leg is from Baltimore-Washington International Airport (KBWI) to Philadelphia International Airport (KPHL); the second leg is from Philadelphia International Airport (KPHL) to Bangor International Airport (KBGR) in Bangor, Maine; and the third leg is from Bangor International Airport (KBGR) to Greater Moncton International Airport (CYQM).

The data box 50 illustrates the overall route from Baltimore-Washington International Airport (KBWI) to Grater Moncton International Airport (CYQM), as well as intermediate legs of the route: Philadelphia International Airport (KPHL) to Bangor International Airport (KBGR); and Bangor International Airport (KBGR) to Greater Moncton International Airport (CYQM). The data box 52 illustrates a condition when the first data object (KBWI to CYQM) has been expanded. As shown in the data box 52, this object shows the three legs of the journey, identified with the reference numerals 54, 56 and 58. The data box 60 further illustrates a situation when the data object 54 is expanded. As shown, when the data object 54 is expanded, various navigational information, generally identified with the reference numeral 62, is provided, including a data object regarding the Baltimore-Washington International Airport 64. The box 66 illustrates a condition when the data object 64 is expanded. As shown in the box 66, the data object 64 is expanded to show various navigational information, generally identified with the reference numeral 68, regarding Baltimore-Washington International Airport.

Database Schema

An exemplary data structure for an exemplary electronic container is shown below. In general, the variable names are self-explanatory. Each class or structure is described with a label that looks like "RoutePack:::" that begins an indented section of the listing. All entries which are indented under the class label are parts of that structure. For example, starting from the top of the listing the RoutePack structure contains a member variable named "version" which is a SHORT (for short integer per normal C/C++ type naming practices). In this case, the variable is explicitly two bytes long and has the value "6" stored in little-endian notation.

The next component of the data structure is "MapObject", which stored and starts with a version variable which in this case indicates that this is version "1" of a MapObject data structure This MapObject data structure next contains a Lat-Lon structure (the structure that stores generic Latitude and Longitude information) which is version "1" and in this case has a Latitude of "0' 0" 0'"" and a Longitude of "0' 0" 0'"" ,each stored as a double precision floating point number. The Lat-Lon structure definition is then complete as indicated by the outdent of the next element. That element is the next component of the LatLonAlt structure and defines the Alt member (for Altitude) as being 0 (feet MSL) stored as a double precision floating point number. After that, the definition of the MapObject continues.

A few sections of the structure are encoded . More specifically, a few sections of the RoutePack content are listed as a STRUCTURE or BLOB and their hex contents listed. In general this content is intended to be opaque components. In many cases they are encoded such that private or proprietary data can be retained within the daqta structure with some security. Examples of this type of data could be Social Security Numbers of pilots, advanced aircraft performance data, credit card information, etc.

An exemplary electronic container described below may be reproduced using any avalable Hex editor (emacs hexl mode, the hex edit mode in Visual Studio, the hex mode in CodeWright, the memory edit mode in Microsoft's DEBUG program, etc) by entering the listed hex numbers in the order listed into a contiguous block of memory and saving it as a file.

Obviously, many modifications and variations of the present invention are possible in light of the above teachings. Thus, it is to be understood that, within the scope of the appended claims, the invention may be practiced otherwise than as specifically described above.

What is claimed and desired to be secured by a Letters Patent of the United States is:

We claim:

1. An electronic flight bag for use in an aircraft comprising:
   a user interface system for end user selection and configuration of various user defined data objects associated with one or more flight related activities and one or more ground related activities; and
   an electronic container operable for storing said user defined data objects for use and update onboard the aircraft by the end user, via said user interface system, during at least one of a flight activity and a ground related activity, the activities including at least one of aircraft maintenance, route modifications, aircraft performance modeling, pilot training, and preparation of flight logs.

2. The electronic flight bag as recited in claim 1, further including a system for modifying one or more of said user defined data objects.

3. The electronic flight bag as recited in claim 2, further including a system for storing said modified user defined data objects.

4. The electronic flight bag as recited in claim 1, wherein said data objects include data relating to NOTAMs.

5. The electronic flight bag as recited in claim 1, wherein said data objects include data relating to temporary flight restrictions.

6. The electronic flight bag as recited in claim 1, wherein said data objects include data relating to weather data for a flight.

7. The electronic flight bag as recited in claim 1, wherein said data objects include data relating to electronic text pages.

8. The electronic flight as recited in claim 1, wherein said data objects include data relating to flight planning data.

9. The electronic flight bag as recited in claim 8, wherein the flight planning data includes airport approach data.

10. The electronic flight bag as recited in claim 1, wherein said data objects include data relating to route data.

11. The electronic flight bag as recited in claim 10, wherein the route data includes various waypoints relating to a flight.

12. The electronic flight bag as recited in claim 1, wherein said data objects include navigational chart data.

13. The electronic flight bag as recited in claim 1, wherein said user defined data objects have been imported to said system from a plurality of data sources for use during a flight.

14. The electronic flight bag as recited in claim 1, wherein flight data stored within said electronic container can be updated during flight and saved for use in subsequent flights.

15. The electronic flight bag as recited in claim 1, wherein said electronic container comprises data required and desired by a flight crew for a particular flight, the data loaded onto said electronic container during a ground phase, said electronic container operable to be carried on board the aircraft for interface with said user interface system and use during a flight phase.

\* \* \* \* \*